US008586510B2

(12) United States Patent
McCabe et al.

(10) Patent No.: US 8,586,510 B2
(45) Date of Patent: Nov. 19, 2013

(54) METHODS AND COMPOSITIONS FOR DELAYING THE RELEASE OF TREATMENT CHEMICALS

(75) Inventors: Michael A. McCabe, Duncan, OK (US);
Jim D. Weaver, Duncan, OK (US);
Robert E. Hanes, Oklahoma, OK (US);
Billy F. Slabaugh, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 1287 days.

(21) Appl. No.: 11/107,427

(22) Filed: Apr. 15, 2005

(65) Prior Publication Data

US 2006/0234870 A1 Oct. 19, 2006

(51) Int. Cl.
*C09K 8/588* (2006.01)

(52) U.S. Cl.
USPC ........... 507/222; 507/219; 507/224; 507/225; 507/229; 507/230; 507/240; 507/242; 507/244

(58) Field of Classification Search
None
See application file for complete search history.

(56) References Cited

U.S. PATENT DOCUMENTS

| | | | | |
|---|---|---|---|---|
| 3,868,328 A * | 2/1975 | Boothe et al. | .................. | 507/222 |
| 4,506,734 A * | 3/1985 | Nolte | .......................... | 166/308.1 |
| 4,741,401 A * | 5/1988 | Walles et al. | ................. | 166/300 |
| 5,102,558 A * | 4/1992 | McDougall et al. | .......... | 507/260 |
| 5,110,486 A * | 5/1992 | Manalastas et al. | .......... | 507/260 |
| 5,164,099 A * | 11/1992 | Gupta et al. | .................. | 507/214 |
| 5,437,331 A | 8/1995 | Gupta et al. | | |
| 6,209,646 B1 | 4/2001 | Reddy et al. | | |
| 6,342,467 B1 | 1/2002 | Chang et al. | | |
| 6,444,316 B1 * | 9/2002 | Reddy et al. | .................. | 428/407 |
| 6,488,091 B1 | 12/2002 | Weaver et al. | ................. | 166/300 |
| 6,672,385 B2 * | 1/2004 | Kilaas et al. | ............. | 166/250.01 |
| 6,723,683 B2 * | 4/2004 | Crossman et al. | ............ | 507/111 |
| 7,306,035 B2 * | 12/2007 | Collins et al. | ................. | 166/263 |
| 2003/0032562 A1 * | 2/2003 | Crossman et al. | ............ | 507/212 |
| 2006/0199742 A1 * | 9/2006 | Arisz et al. | .................... | 507/114 |

FOREIGN PATENT DOCUMENTS

| | | |
|---|---|---|
| CA | 1 262 507 | 10/1989 |
| CA | 1 307 781 | 9/1992 |
| EP | 0 379 236 | 7/1990 |
| EP | 0 594 364 | 4/1994 |
| WO | WO 2004016906 A1 * | 2/2004 |

OTHER PUBLICATIONS

Examination Report issued in counterpart UK application No. 0722578.2, Jul. 22, 2009.
Office Action for Canadian Patent Application No. 2,608,507 dated Jun. 2, 2010.
Examination Report issued in counterpart UK Application No. GB 0722578.2 dated May 24, 2010.

* cited by examiner

*Primary Examiner* — John J Figueroa
(74) *Attorney, Agent, or Firm* — Robert A. Kent; McDermott Will & Emery LLP (57) ABSTRACT

A method comprising: providing at least one encaged treatment chemical that comprises a treatment chemical and a polymer carrier; placing the encaged treatment chemical into a portion of a subterranean formation; and allowing the treatment chemical to diffuse out of the encaged treatment chemical and into a portion of the subterranean formation or an area adjacent thereto.

20 Claims, 4 Drawing Sheets

METHODS AND COMPOSITIONS FOR DELAYING THE RELEASE OF TREATMENT CHEMICALS

BACKGROUND OF THE INVENTION

The present invention relates to hydrocarbon production treatments. More particularly, the present invention relates to methods and compositions for delaying the release of treatment chemicals. Even more particularly, the present invention is directed toward encaged treatment chemicals and methods of using them in subterranean applications. The term "encaged treatment chemical" refers to a "treatment chemical" that is encaged within a three-dimensional "polymer carrier" so that its release may be delayed.

In hydrocarbon exploration and production, a variety of treatment chemicals may be used to facilitate the production of the hydrocarbons. These include gel breakers, dispersing agents, and defoamers, among others. Unfortunately, many treatment chemicals may be adversely affected by exposure to the well bore environment before the chemicals reach their desired destinations in the subterranean formation. This can result in the reaction of the treatment chemical within the well bore, which, depending on the treatment chemical, could affect negatively the production potential of the well. The functionality of a particular fluid system may be adversely affected if a treatment chemical is released prematurely.

Figure 1A:
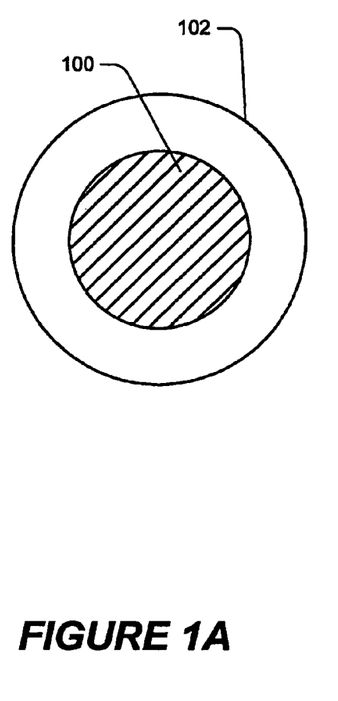
FIG. 1A is an illustration of an encapsulated treatment chemical for a comparative illustration.
Figure 1B:
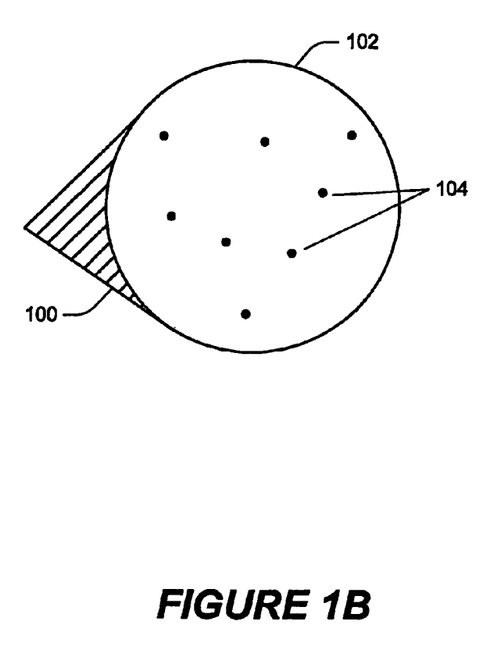
FIG. 1B illustrates some of the problems that can exist with encapsulated treatment chemicals.

To combat these potential production setbacks, a variety of chemical or mechanical methods have been used to inhibit the interaction of the treatment chemical with the well bore environment. Some methods involve physically isolating the treatment chemicals from the well bore environment by injecting the chemicals into the reservoir through coiled tubing or a similar material. Other methods have used porous media to absorb the treatment chemical and then allow it to diffuse out of the media over time. Still other methods have encapsulated the treatment chemical within a degradable coating that degrades down hole to release the treatment chemical at a desired time or place. Several problems exist with conventional encapsulation techniques. For instance, in applications using latexes, rubbers, plastics, or zeolite materials to coat or encapsulate a treatment chemical, inadequate control over the size of pore throats and/or the surface areas of exposed surfaces has prevented consistent, reliable applications. FIG. 1A is an illustration of an encapsulated treatment chemical for a comparative illustration. Shown at 100 is a treatment chemical that is coated by coating 102. FIG. 1B illustrates some of the problems that can exist with encapsulated treatment chemicals. For example, coating 102 has imperfections 104. Also, treatment chemical 100 is not completed coated with coating 102, and therefore, may not be protected from diffusion to the extent necessary to achieve the desired purpose.

Another conventional method that has been suggested to delay the release of a treatment chemical involves the use of "clathrates," which is a unique class of chemical compounds in which a rigid, open network of bonded host molecules enclose, without directly chemically bonding to, appropriately-sized guest molecules of another substance. However, development clathrate-based treatment chemicals has been problematic. For example, the release rate is typically such that the treatment chemical is released too slowly to be used as an effective delivery mechanism, if the chemical is released at all. Thus, unable to reliably release the treatment chemical, clathrate-based delivery mechanisms have proven inadequate for hydrocarbon production treatments to date.

SUMMARY OF THE INVENTION

The present invention relates to hydrocarbon production treatments. More particularly, the present invention relates to methods and compositions for delaying the release of treatment chemicals. Even more particularly, the present invention is directed toward encaged treatment chemicals and methods of using them in subterranean applications.

In one embodiment, the present invention provides a method comprising: providing at least one encaged treatment chemical that comprises a treatment chemical and a polymer carrier; placing the encaged treatment chemical into a portion of a subterranean formation; and allowing the treatment chemical to diffuse out of the encaged treatment chemical and into a portion of the subterranean formation or an area adjacent thereto.

In one embodiment, the present invention provides an encaged treatment chemical for use in a subterranean application comprising a subterranean treatment chemical and a polymer carrier.

The features and advantages of the present invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

The present invention relates to hydrocarbon production treatments. More particularly, the present invention relates to methods and compositions for delaying the release of treatment chemicals. Even more particularly, the present invention is directed toward encaged treatment chemicals and methods of using them in subterranean applications. Because the treatment chemical is encaged within a polymer carrier, the release of the treatment chemical may be delayed so that, inter alia, the treatment chemical is able to be delivered to a specific, desired portion of a subterranean formation before the treatment chemical is substantially released. In preferred embodiments, once the treatment chemical has been delivered to an appropriate location, the treatment chemical is able to interact with components in a subterranean formation, e.g., by diffusing out of the polymer carrier.

The term "encaged treatment chemical" refers to a "treatment chemical" that is encaged within a three-dimensional "polymer carrier" so that its release may be delayed. The term "encaged" does not imply a particular degree of enclosure of the treatment chemical within the polymer carrier. Both the degree of encagement and the concentration of the treatment chemical in the polymer carrier affect the rate at which the treatment chemical will ultimately be released. Thus, to provide an optimal release, the degree of encagement and the concentration of the treatment chemical in the polymer carrier should be considered. In some embodiments, the treatment chemical may be soluble in the polymeric carrier (e.g., homogeneous); in other embodiments, the treatment chemical may be insoluble (e.g., heterogeneous). In some embodiments, a heterogeneous mixture may have a longer associated delay time for the treatment chemical, depending on, inter alia, the salts present in the mixture. The primary considerations in determining what degree of encagement is appropriate include, but are not limited to: the treatment chemical and its reactivity in the subterranean formation; the treatment chemical and its reactivity in the particular treatment fluids to which it is exposed; the desired delay period before release of the treatment chemical; and the compositions of the treatment chemical and polymer carrier (e.g., vis-à-vis each other).

The term "treatment chemical" does not imply any particular action by the chemical or a component thereof. A "treatment chemical" may be any component that is to be placed downhole to perform a desired function, e.g., act upon a portion of the subterranean formation, a tool, or a composition located downhole. Any treatment chemical that is useful down hole and that does not adversely react with the polymer carrier may be used as a treatment chemical in the present invention. Suitable treatment chemicals include, but are not limited to, chelating agents (e.g., EDTA, citric acid, polyaspartic acid), scale inhibitors, gel breakers, dispersants, paraffin inhibitors, wax inhibitors, corrosion inhibitors, de-emulsifiers, foaming agents, tracers, defoamers; delinkers; scale inhibitors, crosslinkers, surfactants, derivatives and/or combinations thereof. For instance, a treatment chemical may be a boron-based crosslinking agent that will be used to crosslink a gelling agent downhole.

According to the present invention a polymer carrier encages a treatment chemical to form an encaged treatment chemical. The term "polymer carrier" refers to a three-dimensional organic, inorganic or hybrid structure composed of repeat units of a desired chemical functional group that possesses mechanical, chemical and physical properties commiserate with the use of the encaged treatment chemical. The number of the repeat units of the material is not critical, e.g., oligomers may be suitable in some embodiments. In certain embodiments, a polymer carrier may be a three-dimensional polymeric structure that is at least partially capable of encaging a treatment chemical. The polymer carrier may penetrate the treatment chemical. The molecular chains of the polymer carrier may react with themselves so as to entrap the treatment chemical within the resultant three-dimensional polymeric carrier structure. In some embodiments, the polymer carrier may be a three-dimensional hydrated structure that supports a treatment chemical. In other embodiments, the encaging polymer carrier may be dehydrated so that the pockets of polymer collapse around the treatment chemical so that the treatment chemical is released more slowly and only as the polymer rehydrates and slowly swells. The treatment chemical is then likely released at a rate of diffusion generally commiserate to the rate of diffusion of the polymer around the treatment chemical.

Any method known in the art may be used to create the encaging polymer carrier of the encaged treatment chemicals of the present invention. In some embodiments, a suitable monomer is mixed with a suitable treatment chemical and then the monomer is allowed to polymerize so as to encage the treatment chemical (referred to herein as the "monomer embodiments"). In such monomer embodiments, any known suitable polymerization method (including, but not limited to, free radical polymerization, condensation polymerization, vinyl polymerization, emulsion polymerization, etc.) may be used. In other embodiments of the present invention, a polymer may be mixed with a treatment chemical and then crosslinked around the treatment chemical. In embodiments of the present invention wherein a monomer is made to polymerize to substantially surround a treatment chemical, a mixture comprising the monomer and the treatment chemical are combined along with a polymerization activator such that the monomer polymerizes to eventually form a polymer carrier around the treatment chemical. In some embodiments, a crosslinking agent may also be added to the mixture to cause the formed polymer to have crosslinks. The choice of monomer, polymerization activator, and crosslinking agent (when used) should be made in such a way that the chosen compounds will not negatively interact with the chosen treatment chemical. In that way, the treatment chemical may be at least partially physically trapped within the polymer carrier. In some alternative embodiments of the present invention the treatment chemical may be covalently or otherwise weakly reversibly bonded to the treatment chemical.

Figure 2:
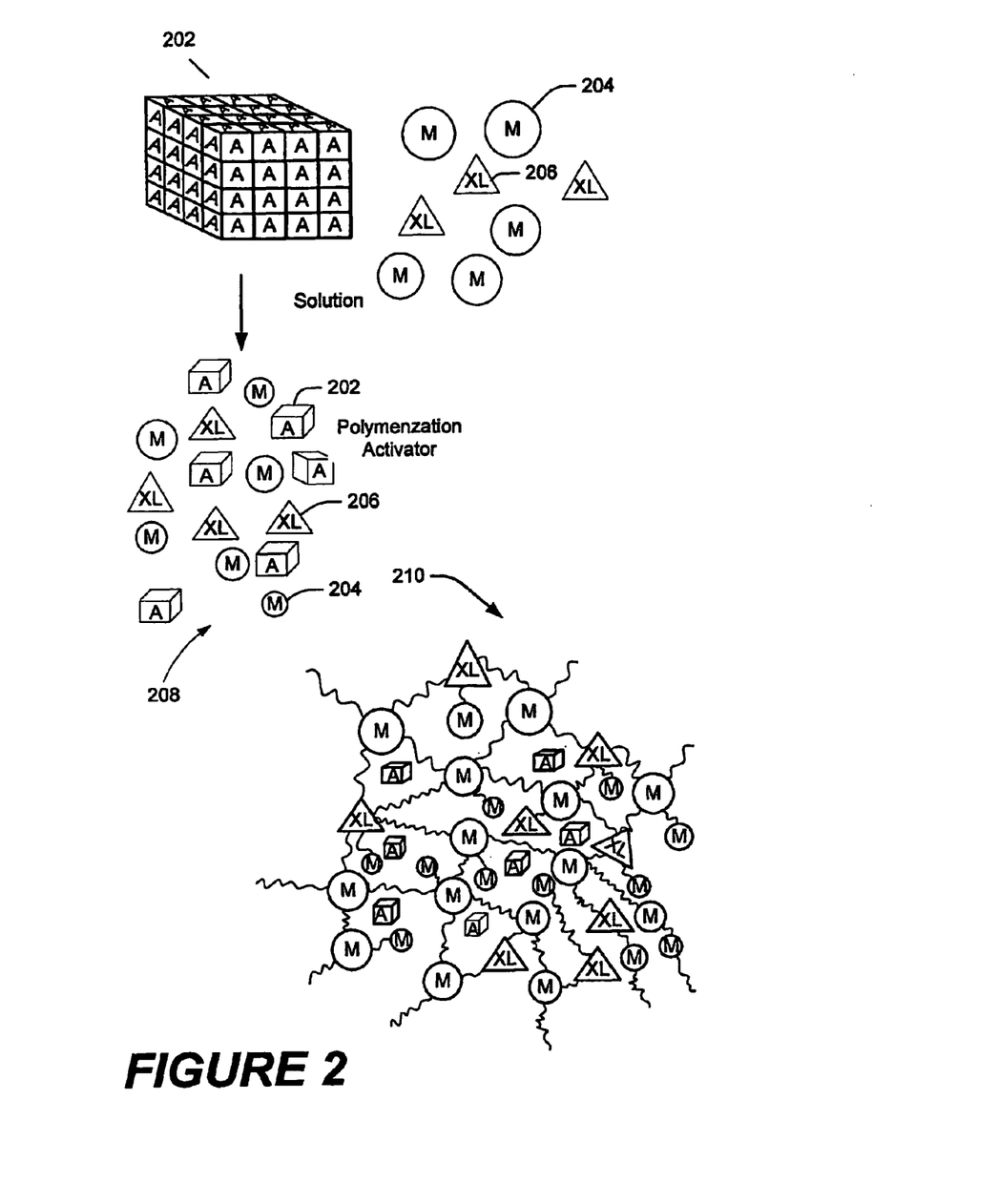
FIG. 2 is a "cartoon" illustration (e.g., a pictorial representation of an idea) of an embodiment of an encaged treatment chemical of the present invention wherein a monomer is used to form the polymer carrier (shown two-dimensionally to represent a three-dimensional structure).

FIG. 2 is a "cartoon" illustration (e.g., a pictorial representation of an idea to convey a point) of an embodiment of an encaged treatment chemical of the present invention wherein a monomer is used to form the polymer carrier. Although it is illustrated two-dimensionally, the structure is actually a three-dimensional structure. In FIG. 2, A shown by 202 is a treatment chemical, M (at 204) denotes a monomer, and XL (at 206) denotes a crosslinking agent. The treatment chemical, monomer, and an optional crosslinking agent are placed into a solution, which is shown generally at 208. A suitable polymerization activator is added, and an encaged treatment chemical (shown generally at 210) is produced. As illustrated in a cartoon fashion at 210, the treatment chemical A is embedded within pockets of the three-dimensional polymer carrier formed by the interactions and polymerizations of M and XL. Note that the pockets may be interpolymer pockets or intrapolymer pockets. The term "pocket" as used herein refers to an opening between molecular chains.

In the monomer embodiments, a variety of monomers may be suitable. Examples include, but are not limited to, acrylamide; styrene; butadiene; methacrylate; N-isopropyl acrylamide; N,N-dimethyl acrylamide; methacrylamide; and, methylacrylate. Acrylamide is a preferred monomer. Other monomers known in the art that are capable of being polymerized also may be suitable for use in the present invention. Examples include anionic monomers (such as sodium acrylate) or cationic polymers (such as trimethyl allyl ammonium chloride and dimethyl diallyl ammonium chloride). One should be mindful that ionic attraction between the monomer/polymer and the treatment chemical may affect the diffusion rate of the treatment chemical. Selection of an appropriate monomer may be based, at least in part, on the environment in which the encaged treatment chemical is to be used. For example, it may be important to consider whether the treatment chemical will be released into an oil-based or water-based environment. Moreover, the choice of a monomer may depend on the treatment chemical. For example, a hydrophobic monomer may be used with a water-soluble treatment chemical, while a hydrophilic monomer may be preferred for an oil-soluble treatment chemical. In other cases, hydrophobic monomers may be combined with hydrophilic monomers to tune the release of the encaged treatment chemical through the resultant polymer carrier. For example, creating polymer gels whose surface is more hydrophobic, thereby slowing the hydration with water, may slow the diffusion rate. With the benefit of this disclosure, it should be within the ability of one skilled in the art to select an appropriate monomer. In some embodiments of the present invention the monomer is present in the mixture used to create the encaged treatment chemical in an amount ranging from about 10% to about 60% of the mixture. In some embodiments of the present invention the monomer is present in the mixture in an amount ranging from about 15% to about 35% of the mixture.

In some embodiments, a variety of polymerization activators may be used in the monomer embodiments of the methods of the present invention. In one embodiment, wherein the monomer is to be polymerized using free-radical polymerization, the polymerization activator may comprise a free-radical source. Generally, suitable free-radical sources are thermal free-radical initiators. Some suitable free-radical sources include, but are not limited to, sodium persulfate, sodium, potassium or organic peroxides, and sodium or potassium perborate bis azo compounds ("AIBN"). In other embodiments, a suitable polymerization activator may be a physical catalyst such as heat, time, or mechanical shear. In embodiments wherein the polymerization activator is a free radical source, a chain-transfer agent may be used to make the free-radical source more active. Generally, the chain-transfer agent forms an N-oxide that is capable of reacting with a free-radical source to form a stabilized free radical, thus lengthening the lifetime of the free radical. Any water soluble amine may be used as a suitable chain-transfer agent, including triethanolamine, spermidine, pyridine, and N-methylmorpholine.

In the monomer embodiments, optionally, a suitable crosslinking agent may be included so that crosslinks between polymeric molecules are incorporated within the three-dimensional structure of the polymer carrier. Suitable crosslinking agents typically comprise at least one ion that is capable of crosslinking at least two polymer molecules. Examples of suitable crosslinking agents include, but are not limited to, boric acid, disodium octaborate tetrahydrate, sodium diborate, pentaborates, ulexite and colemanite, compounds that can supply zirconium IV ions (such as, for example, zirconium lactate, zirconium lactate triethanolamine, zirconium carbonate, zirconium acetylacetonate, zirconium malate, zirconium citrate, and zirconium diisopropylamine lactate); compounds that can supply titanium IV ions (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or a combination thereof. An example of a suitable commercially available zirconium-based crosslinking agent is "CL-24" available from Halliburton Energy Services, Inc., Duncan, Okla. An example of a suitable commercially available titanium-based crosslinking agent is "CL-39" available from Halliburton Energy Services, Inc., Duncan Okla. When used, the crosslinking agent is generally included with the treatment chemical and monomer in an amount ranging from about 10% to about 40% of the total mixture. In some embodiments, the crosslinking agent is included with the treatment chemical and monomer in an amount ranging from about 15% to about 35% of the total mixture.

Figure 3:
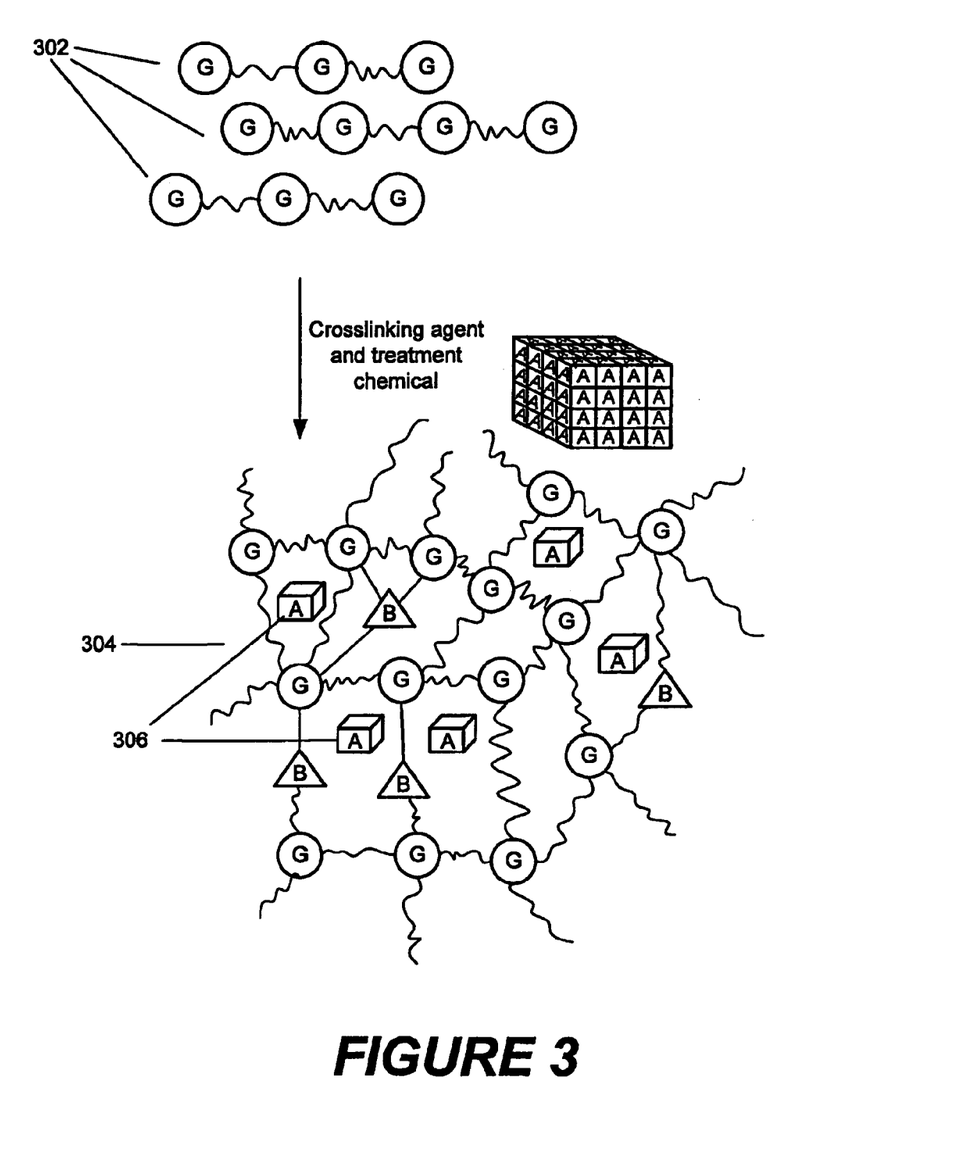
FIG. 3 is a "cartoon" illustration of an embodiment of an encaged treatment chemical of the present invention wherein a polymer is used to form the polymer carrier (shown two-dimensionally to represent a three-dimensional structure).

In alternative embodiments, rather than starting with a monomer to form an encaged treatment chemical, a polymer may be used (referred to as the "polymer embodiments.") FIG. 3 is a "cartoon" illustration of such an embodiment. Suitable polymer molecules are marked as G and shown at 302. These molecules may be mixed with an (optional) crosslinking agent (XL) and a treatment chemical (A) to form an encaged treatment chemical shown generally at 304. The treatment chemical A shown at 306 is embedded within pockets of the three-dimensional polymer carrier formed by the interactions and polymerizations of the polymer molecules (G) and the crosslinking agent (XL).

In the polymer embodiments, a variety of polymers may be suitable. Suitable polymers typically comprise polymers, synthetic polymers, or a combination thereof. Examples include, but are not limited to, hydratable polymers that contain one or more functional groups such as hydroxyl, cis-hydroxyl, carboxylic acids, and derivatives of carboxylic acids, sulfate, sulfonate, phosphate, phosphonate, amino, or amide. In certain exemplary embodiments, the polymers may comprise polysaccharides, and derivatives thereof that contain one or more of the following monosaccharide units: galactose, mannose, glucoside, glucose, xylose, arabinose, fructose, glucuronic acid, and pyranosyl sulfate. Examples of suitable polymers include, but are not limited to, guar gum and derivatives thereof, such as hydroxypropyl guar and carboxymethylhydroxypropyl guar, and cellulose derivatives, such as hydroxyethyl cellulose. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other exemplary embodiments, the polymer may be somewhat depolymerized. The term "depolymerized," as used herein, generally refers to a decrease in the molecular weight of the polymer. Depolymerized polymers are described in U.S. Pat. No. 6,488,091 issued Dec. 3, 2002 to Weaver, et al., the relevant disclosure of which is incorporated herein by reference.

In the polymer embodiments, optionally a crosslinking agent may be used. A variety of crosslinking agents may be suitable. Examples of suitable crosslinking agents include, but are not limited to, boric acid, disodium octaborate tetrahydrate, sodium diborate, pentaborates, ulexite and colemanite, compounds that can supply zirconium IV ions (such as, for example, zirconium lactate, zirconium lactate triethanolamine, zirconium carbonate, zirconium acetylacetonate, zirconium malate, zirconium citrate, and zirconium diisopropylamine lactate); compounds that can supply titanium IV ions (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or a combination thereof. An example of a suitable commercially available zirconium-based crosslinking agent is "CL-24" available from Halliburton Energy Services, Inc., Duncan, Okla. An example of a suitable commercially available titanium-based crosslinking agent is "CL-39" available from Halliburton Energy Services, Inc., Duncan Okla. When used, the crosslinking agent is generally included with the treatment chemical and polymer in an amount ranging from about 10% to about 40% of the total mixture. In some embodiments, the crosslinking agent is included with the treatment chemical and polymer in an amount ranging from about 15% to about 35% of the total mixture.

In alternative embodiments, the treatment chemical may be impregnated into a polymer carrier. In an example of such an embodiment, a polymeric bead (e.g., polystyrene bead) may be swelled with a suitable solvent so that the pores of the bead are enlarged. A treatment chemical may then be added to the mixture. The treatment chemical should become trapped in the pores of the polymeric carrier. The polymeric carrier may then be collapsed so that the pores shrink. When added to a well bore, the polymeric carrier may swell so as to release the treatment chemical from its pores. Any polymers mentioned above may be used in these embodiments of the present invention. Examples of suitable polymeric materials include, but are not limited to, latexes, polystyrenes, polyvinyl chlorides, polyesters, polyolefins, polycarbonates, and polybutadienes. Some specific examples include, but are not limited to, Wang resins (4-benzyloxybenzyl alcohol, polymer bound), Janda Jel-NH2 resins (polystyrene cross-linked with a tetrahydrofuran linker (Aldrich Chemical Company, St. Louis, Mo.)), and Merrifeld resins (chloromethylated polystyrene). Preferred cross-linked polystyrene derivatives for use in the present invention include halomethyl, amino, or hydroxy derivatives. Each of these are specific examples of crosslinked polystyrene derivatives with preferable derivatives being the halomethyl, amino or hydroxy groups, and copolymers or terpolymers thereof.

In any of the above mentioned embodiments, the rate of diffusion of the treatment chemical from an encaged treatment chemical may be tailored through the addition of a salt to the polymer carrier. Generally, the more endothermic the chosen salt, the longer it takes for the resulting polymer carrier to release the treatment chemical. Thus, salts having an endothermic heat of dilution in water may be suitable. Such suitable salts include, but are not limited to, potassium chloride, cesium chloride, and ammonium chloride. Further details on the effect of a chosen salt on the rate of diffusion can be found in the examples, below. Others skilled in the art, with the benefit of this disclosure, should be able to identify other suitable salts.

Some embodiments of the encaged treatment chemicals of the present invention may also include other additives such as a pH adjusting agent (such as a buffer like potassium carbonate or ammonium acetate) or a caustic agent (like sodium hydroxide, potassium hydroxide, ammonium hydroxide). Generally, a caustic agent may react with the treatment chemical to generate a form of the treatment chemical suitable for release from the polymer carrier. For example, in the case of a boron treatment agent, a high concentration of caustic agent results in the formation of sodium tetraborate, which should equilibrate with the solution upon release, further contributing to the delay of the treatment chemical reacting with the formation. Also for example, in the case of ethylenediaminetetraacetic acid ("EDTA"), the caustic agent forms tetracarboxylate, which may be used for chelating and delinking fluids with zirconium or titanium crosslinks. Suitable caustic agents include, but are not limited to, sodium hydroxide, potassium hydroxide, and ammonium hydroxide. Further details on the effect of pH on the rate of diffusion can be found in the examples, below.

Once an encaged treatment chemical has been formed by any suitable method, it may be used in that form or, alternatively, it may be dehydrated and ground to a suitable size for use down hole. Generally, the dehydration process involves vacuum drying. The grind size provides a further variable through which to control the diffusion of the treatment chemicals out of the polymer carrier. Where the mixture is dried and ground, the selected grind size may range from about 4 to about 100 mesh U.S. Sieve Series. For example, in embodiments wherein the treatment chemical is a boric acid crosslinker, a larger grind size of about 8 to about 10 mesh standard U.S. Sieves may be selected. In certain embodiments, the size of particles separated with sieves may be selected based on the desired crosslink time (for further detail, see Table 6 in the examples). In other embodiments, the cage material may be added without dehydration (therefore no grinding is necessary). In such embodiments the material may be added to the treatment fluid as an emulsion or slurry.

In particular embodiments of the present invention, computer simulation software may be used to select the proper mixture of chemicals used to form an encaged treatment chemical and its associated polymer carrier so that the encaged treatment chemical exhibits or demonstrates the desired characteristics. An example of one such piece of simulation software is Formulation Assisted Software Toolkit ("FAST") available from Accelrys, Inc., of San Diego, Calif., which includes algorithms for statistically optimizing and planning new formulations that exhibit specific measurable properties, such as time to crosslink or delink a given formulation, among others.

To facilitate a better understanding of the present invention, the following examples of certain aspects of some embodiments are given. In no way should the following examples be read to limit, or define, the scope of the invention.

EXAMPLES

The following examples involve encaging a treatment chemical (in this case, specifically a boron crosslinking agent) inside a polymer carrier according to the present invention. The experiments below, inter alia, looked at the amount of time it took the boron crosslinking agent to diffuse from the polymer carrier and crosslink a fluid.

Viscosified treatment fluid samples were prepared and the viscosities of the samples were measured over time with increasing temperatures using a Nordman Instruments Model 5004 viscometer equipped with a B5X bob. The samples included either crosslinked gelling agents crosslinked with mineral salts of boric acid (which is commercially available from Halliburton Energy Services, Duncan, Okla. as CL-28) or boric acid trapped within a polymer carrier of the present invention. Comparative test samples were prepared such that the active concentration of CL-28 and the polymer carrier contained substantially identical active boron concentrations.

Example 1

Crosslinking with Encaged Boric Acid

A sample of a boron crosslinked gelling agent viscosified treatment fluid was prepared by adding the following to tap water: 40 lb/MGAL guar gum; 2.25 gal/MGAL sodium hydroxide; and 1 gallon of a nonionic surfactant. As a control, 1.4 gal/MGAL CL-28, a conventional mineral based, slow dissolving boric acid, was used to crosslink the fluid. For comparison, the cage trapped boric acid (2 g/L boric acid in polymer carrier) was used to crosslink an identical fluid.

Figure 4:
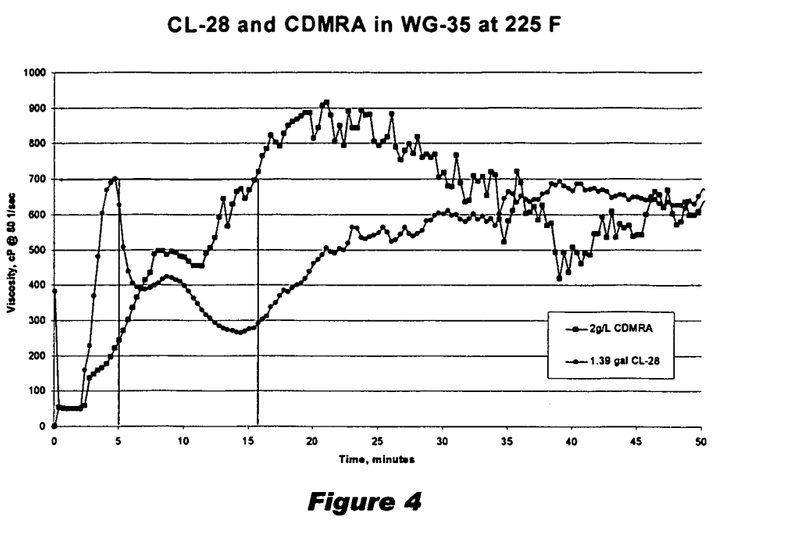
FIG. 4 illustrates some viscosity data.

The temperatures of the samples were increased to 225° F., and their viscosities were measured. The results appear in FIG. 4, below, which illustrates the change in viscosity of the two fluids. The delayed action of the encaged boric acid can be seen by comparing the crosslinked viscosities of the two fluids. In particular, a review of FIG. 1 at about 4 minutes and about 15 minutes is interesting. For the control sample, a viscosity of 669 cP was obtained after only four minutes. For the encaged boric acid sample, a viscosity of 669 cP was only obtained after 15 minutes. These results illustrate a delay in the encaged boric acid sample. Moreover, surprisingly the encaged boric acid sample showed a steady increase in viscosity with time, contrasting this with the control sample, which achieved a peak viscosity and then immediately began to reduce viscosity to less than half of that peak before rebuilding.

Example 2

Demonstration of Changing Static Crosslink Time at 120° F.

To form an encaged treatment chemical (in this case, specifically a boron crosslinking agent) the following general procedure was followed:

A brine was selected and mixed with a monomer (specifically, acrylamide), a crosslinking agent (specifically, N,N methylenebisacrylamide), a treatment chemical (specifically, boric acid), and a chain transfer agent (specifically, triethanolamine). Next, the pH was adjusted to a desired level (in all cases except those illustrated in Table 4) the pH was adjusted to about 8. A polymerization activator (sodium persulfate) was added, then placed in a temperature controlled water bath (in all cases except those illustrated in Table 6, the temperature was adjusted to about 120° F.).

Each of the tables below describes the results of modifying the polymer carrier by changing one or more variables. Altering one or more of the conditions in Tables 1 through 7 may permit optimization of the system to the desired application. Cage samples were screened using static crosslink time tests. The crosslink time was measure in seconds and is shown in

TABLE 1

Crosslink Time by Changing Alkali Metal Cation

| Acrylamide, (moles) | N,N methylenebisacrylamide, (moles) | Boric Acid, (moles) | Sodium Persulfate, (moles) | Salt Type | Salt Loading, (moles) | Crosslink Time, (sec) |
|---|---|---|---|---|---|---|
| 0.25 | 0.02 | 0.24 | 0.0042 | LiCl | 0.23 | 648.00 |
| 0.25 | 0.02 | 0.24 | 0.0042 | KCl | 0.23 | 662.00 |
| 0.25 | 0.02 | 0.24 | 0.0042 | CsCl | 0.23 | 716.00 |

TABLE 2

Crosslink Time by Changing KCl Concentration

| Acrylamide, (moles) | N,N methylenebisacrylamide, (moles) | Boric Acid, (moles) | Sodium Persulfate, (moles) | KCl, (moles) | Crosslink Time, (sec) |
|---|---|---|---|---|---|
| 0.25 | 0.016 | 0.24 | 0.0042 | 0.5635 | 712 |
| 0.25 | 0.016 | 0.24 | 0.0042 | 0.3756 | 592 |
| 0.25 | 0.016 | 0.24 | 0.0042 | 0.2348 | 648 |
| 0.25 | 0.016 | 0.24 | 0.0042 | 0.1878 | 861 |
| 0.25 | 0.016 | 0.24 | 0.0042 | 0.1409 | 488 |
| 0.25 | 0.016 | 0.24 | 0.0042 | 0.0470 | 891 |
| 0.25 | 0.016 | 0.24 | 0.0042 | 0.0094 | 838 |

TABLE 3

Crosslink Time by Changing Sodium Persulfate Concentration

| Acrylamide, (moles) | N,N methylenebisacrylamide, (moles) | Boric Acid, (moles) | Sodium Persulfate, (moles) | KCl, (moles) | Crosslink Time, (sec) |
|---|---|---|---|---|---|
| 0.25 | 0.02 | 0.24 | 0.0252 | 0.19 | 264 |
| 0.25 | 0.02 | 0.24 | 0.0168 | 0.19 | 503 |
| 0.25 | 0.02 | 0.24 | 0.0084 | 0.19 | 753 |
| 0.25 | 0.02 | 0.24 | 0.0042 | 0.19 | 663 |
| 0.25 | 0.02 | 0.24 | 0.0021 | 0.19 | 786 |

TABLE 4

Crosslink Time by Changing pH of Cage Solution

| pH | Acrylamide, (moles) | N,N methylenebisacrylamide, (moles) | Boric Acid, (moles) | Sodium Persulfate, (moles) | KCl, (moles) | Crosslink Time, (sec) |
|---|---|---|---|---|---|---|
| 8 | 0.27 | 0.0065 | 0.24 | 0.0042 | 0.02 | 44 |
| 4 | 0.27 | 0.0065 | 0.24 | 0.0042 | 0.02 | 440 |
| 12 | 0.27 | 0.0065 | 0.24 | 0.0042 | 0.02 | 978 |

TABLE 5

Crosslink Time by Changing Grind Size

| Grind size, (microns) | Acrylamide, (moles) | N,N methylenebisacrylamide, (moles) | boric acid, (moles) | sodium persulfate, (moles) | KCl, (moles) | crosslink time, (sec) |
|---|---|---|---|---|---|---|
| 53 | 0.25 | 0.02 | 0.24 | 0.0042 | 0.56 | 433 |
| 106 | 0.25 | 0.02 | 0.24 | 0.0042 | 0.56 | 426 |
| 250 | 0.25 | 0.02 | 0.24 | 0.0042 | 0.56 | 102 |
| 420 | 0.25 | 0.02 | 0.24 | 0.0042 | 0.56 | 274 |
| 850 | 0.25 | 0.02 | 0.24 | 0.0042 | 0.56 | 324 |
| 1000 | 0.25 | 0.02 | 0.24 | 0.0042 | 0.56 | 369 |
| 1400 | 0.25 | 0.02 | 0.24 | 0.0042 | 0.56 | 649 |
| 2000 | 0.25 | 0.02 | 0.24 | 0.0042 | 0.56 | 854 |

TABLE 6

Crosslink Time by Changing the Cage Synthesis Temp

| Cage Synthesis Temp, (° F.) | acrylamide, (moles) | N,N methylenebisacrylamide, (moles) | boric acid, (moles) | sodium persulfate, (moles) | KCl, (moles) | crosslink time, (sec) |
|---|---|---|---|---|---|---|
| 80 | 0.13 | 0.0084 | 0.13 | 0.0022 | 0.30 | 739.00 |
| 90 | 0.13 | 0.0084 | 0.13 | 0.0022 | 0.30 | 784.00 |
| 100 | 0.13 | 0.0084 | 0.13 | 0.0022 | 0.30 | 715.00 |
| 110 | 0.13 | 0.0084 | 0.13 | 0.0022 | 0.30 | 744.00 |
| 120 | 0.13 | 0.0084 | 0.13 | 0.0022 | 0.30 | 792.00 |
| 140 | 0.13 | 0.0084 | 0.13 | 0.0022 | 0.30 | 750.00 |
| 150 | 0.13 | 0.0084 | 0.13 | 0.0022 | 0.30 | 761.00 |
| 160 | 0.13 | 0.0084 | 0.13 | 0.0022 | 0.30 | 736.00 |
| 170 | 0.13 | 0.0084 | 0.13 | 0.0022 | 0.30 | 800.00 |
| 180 | 0.13 | 0.0084 | 0.13 | 0.0022 | 0.30 | 713.00 |
| 190 | 0.13 | 0.0084 | 0.13 | 0.0022 | 0.30 | 682.00 |
| 200 | 0.13 | 0.0084 | 0.13 | 0.0022 | 0.30 | 641.00 |

TABLE 7

Changing Monomer (moles), Crosslink Time (seconds)

| Monomer #1 | Monomer #2 | N,N methylenebisacrylamide, (moles) | boric acid, (moles) | sodium persulfate, (moles) | crosslink time, (sec) |
|---|---|---|---|---|---|
| acrylic acid, 0.128 moles | none | 0.008 | 0.128 | 0.002 | 289 |
| acrylamide, 0.101 moles | sodium acrylate, 0.021 moles | 0.008 | 0.128 | 0.002 | 451 |
| acrylamide, 0.104 moles | N,N-dimethylacrylamide, 0.017 moles | 0.015 | 0.128 | 0.002 | 476 |
| acrylamide (not dehydrated), 0.129 moles | none | 0.008 | 0.128 | 0.002 | 556 |
| acrylamide, 0.196 moles | none | 0.013 | 0.192 | 0.006 | 607 |
| acrylamide, 0.157 moles | N,N-dimethylacrylamide, 0.032 moles | 0.013 | 0.192 | 0.006 | 632 |
| acrylamide, 0.129 moles | none | 0.008 | 0.128 | 0.002 | 642 |
| acrylamide, 0.157 moles | N,N-isoproplyacrylamide, 0.029 moles | 0.013 | 0.192 | 0.006 | 646 |
| acrylamide, 0.157 moles | methylmethacrylate, 0.032 moles | 0.013 | 0.192 | 0.006 | 672 |
| acrylamide, 0.100 moles | methyl acrylate, 0.024 moles | 0.008 | 0.128 | 0.002 | 681 |
| acrylamide, 0.100 moles | N,N-isoproplyacrylamide, 0.019 moles | 0.008 | 0.128 | 0.002 | 681 |
| acrylamide, 0.157 moles | methyl acrylate, 0.039 moles | 0.013 | 0.192 | 0.006 | 682 |

TABLE 7-continued

Changing Monomer (moles), Crosslink Time (seconds)

| Monomer #1 | Monomer #2 | N,N methylenebisacrylamide, (moles) | boric acid, (moles) | sodium persulfate, (moles) | crosslink time, (sec) |
|---|---|---|---|---|---|
| acrylamide, 0.129 moles | none | 0.008 | 0.128 | 0.002 | 692 |
| acrylic acid, 0.155 moles | none | 0.008 | 0.128 | 0.002 | 753 |

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A method comprising:
polymerizing at least one monomer in the presence of a treatment chemical such that a polymer is substantially surrounded by the treatment chemical when polymerization is complete, thereby creating an encaged treatment chemical within a three-dimensional polymer carrier;
placing the encaged treatment chemical in a treatment fluid; and then
placing the treatment fluid into a subterranean formation; and
allowing the treatment chemical to diffuse out from the three-dimensional polymer carrier and interact with a portion of the subterranean formation.

2. The method of claim 1 wherein the polymer carrier is a hydrated structure.

3. The method of claim 1 wherein the polymer carrier is dehydrated.

4. The method of claim 1 wherein the polymer carrier is crosslinked.

5. The method of claim 1 wherein the polymer carrier is formed from a hydrophobic monomer and the treatment chemical is water-soluble.

6. The method of claim 1 wherein the polymer carrier is formed from a hydrophilic monomer and the treatment chemical is oil-soluble.

7. The method of claim 1 wherein the polymer carrier is formed from a polymerization reaction comprising a monomer selected from the group consisting of: acrylamide, styrene, butadiene, methacrylate, N-isopropyl acrylamide, N,N-dimethyl acrylamide, methacrylamide, methylacrylate, sodium acrylate, trimethyl allyl ammonium chloride, and dimethyl diallyl ammonium chloride.

8. The method of claim 1 wherein the polymer carrier comprises a polymer selected from the group consisting of: polyacrylate, polymethacrylate, polyacrylamide, polyvinyl alcohol and polyvinylpyrrolidone.

9. The method of claim 1 wherein the treatment chemical is trapped in one or more pores of the polymer carrier.

10. The method of claim 1 wherein the treatment chemical comprises at least one of the following selected from the group consisting of: a chelating agent; a scale inhibitor; a gel breaker; a dispersant; a paraffin inhibitor; a wax inhibitor; a corrosion inhibitor; a de-emulsifier; a foaming agent; a tracer; a defoamer; a delinker; a scale inhibitor; a crosslinker; a surfactant; a salt; a caustic agent; derivatives and/or combinations thereof.

11. A method comprising:
swelling a polymer carrier with a solvent;
impregnating the swelled polymer carrier with a treatment chemical thereby forming an encaged treatment chemical;
placing the encaged treatment chemical in a subterranean formation; and
allowing the treatment chemical to interact with a portion of the subterranean formation.

12. The method of claim 11 wherein the polymer carrier is crosslinked.

13. The method of claim 11 wherein the encaged treatment chemical is dehydrated and/or ground.

14. The method of claim 11 wherein the treatment chemical comprises at least one of the following selected from the group consisting of: a chelating agent; a scale inhibitor; a gel breaker; a dispersant; a paraffin inhibitor; a wax inhibitor; a corrosion inhibitor; a de-emulsifier; a foaming agent; a tracer; a defoamer; a delinker; a scale inhibitor; a crosslinker; a surfactant; a salt; a caustic agent; derivatives and/or combinations thereof.

15. The method of claim 11 wherein the polymer carrier is formed from a polymerization reaction comprising a monomer selected from the group consisting of: acrylamide, styrene, butadiene, methacrylate, N-isopropyl acrylamide, N,N-dimethyl acrylamide, methacrylamide, methylacrylate, sodium acrylate, trimethyl allyl ammonium chloride, and dimethyl diallyl ammonium chloride.

16. The method of claim 11 wherein the polymer carrier comprises a polymer selected from the group consisting of: polyacrylate, polymethacrylate, polyacrylamide, polyvinyl alcohol and polyvinylpyrrolidone.

17. The method of claim 11 wherein forming the polymer carrier is crosslinked.

18. The method of claim 11 wherein the treatment chemical is not encapsulated by or coated with the polymer carrier.

19. The method of claim 11 wherein the encaged treatment chemical is not a clathrate.

20. A method comprising:
swelling a polymer carrier with a solvent;
impregnating the swelled polymer carrier with a treatment chemical thereby forming an encaged treatment chemical;
placing the encaged treatment chemical in a subterranean formation; and
allowing the treatment chemical to be released from the encaged treatment chemical into at least a portion of the subterranean formation.

* * * * *